(12) United States Patent
Khandani

(10) Patent No.: US 11,686,606 B2
(45) Date of Patent: Jun. 27, 2023

(54) SYSTEM AND METHOD FOR MEASURING SOIL OR SEDIMENT LEVEL AND MONITORING HYDRAULIC DAMAGE

(71) Applicant: Resensys, College Park, MD (US)

(72) Inventor: Mehdi Kalantari Khandani, Bethesda, MD (US)

(73) Assignee: Resensys LLC, Beltsville, MD (US)

( * ) Notice: Subject to any disclaimer, the term of this patent is extended or adjusted under 35 U.S.C. 154(b) by 0 days.

(21) Appl. No.: 16/872,330

(22) Filed: May 11, 2020

(65) Prior Publication Data

US 2021/0063225 A1    Mar. 4, 2021

Related U.S. Application Data

(60) Provisional application No. 62/895,134, filed on Sep. 3, 2019.

(51) Int. Cl.

| | |
|---|---|
| *G01F 23/22* | (2006.01) |
| *E02D 1/08* | (2006.01) |
| *G01F 15/063* | (2022.01) |
| *G01F 23/00* | (2022.01) |
| *E02D 33/00* | (2006.01) |

(52) U.S. Cl.
CPC ............... *G01F 23/22* (2013.01); *E02D 1/08* (2013.01); *G01F 15/063* (2013.01); *G01F 23/0007* (2013.01); *E02D 33/00* (2013.01)

(58) Field of Classification Search
CPC ............................ E02D 33/00; E02D 2600/10
See application file for complete search history.

(56) References Cited

U.S. PATENT DOCUMENTS

| | | | | |
|---|---|---|---|---|
| 4,893,496 A | * | 1/1990 | Bau | G01N 11/162 |
| | | | | 73/32 A |
| 10,830,661 B2 | * | 11/2020 | Song | G01M 3/38 |
| 2013/0233079 A1 | * | 9/2013 | Swartz | G01F 1/56 |
| | | | | 73/579 |
| 2020/0064129 A1 | * | 2/2020 | Wijewickreme | G01F 1/10 |

FOREIGN PATENT DOCUMENTS

| | | | | | |
|---|---|---|---|---|---|
| CN | 106405760 A | * | 2/2017 | | G01F 23/22 |
| CN | 109610528 A | * | 4/2019 | | E02D 33/00 |
| KR | 20150095718 A | * | 8/2015 | | E03B 7/00 |
| TW | I577966 B | * | 4/2017 | | |

* cited by examiner

*Primary Examiner* — Herbert K Roberts

(57) ABSTRACT

A system includes a conduit, a sensor system and a controller. The conduit may be associated with a structure, having a portion thereof disposed on a surface, and being disposed in a direction normal to the surface. The controller is in communication with the sensor component. When the sensor system is operable to detect when sediment on the surface and surrounding the structure is removed from an area around the structure, an initial length, $l_i$, of the conduit is disposed below the surface of the sediment on the surface and surrounding the structure at an initial time. When the sensor system is operable to detect when sediment is deposited around the structure, the initial length, $l_i$, of the conduit is disposed above the surface at the initial time.

16 Claims, 13 Drawing Sheets

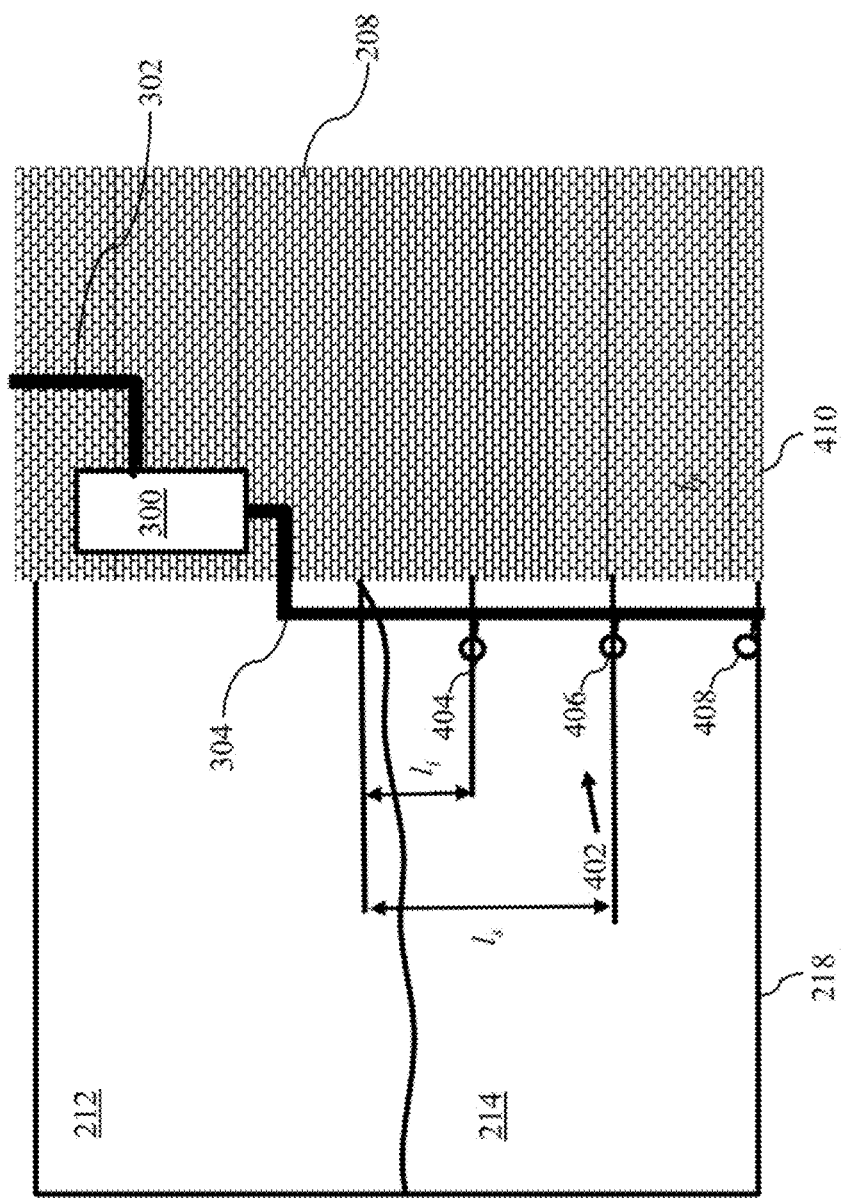

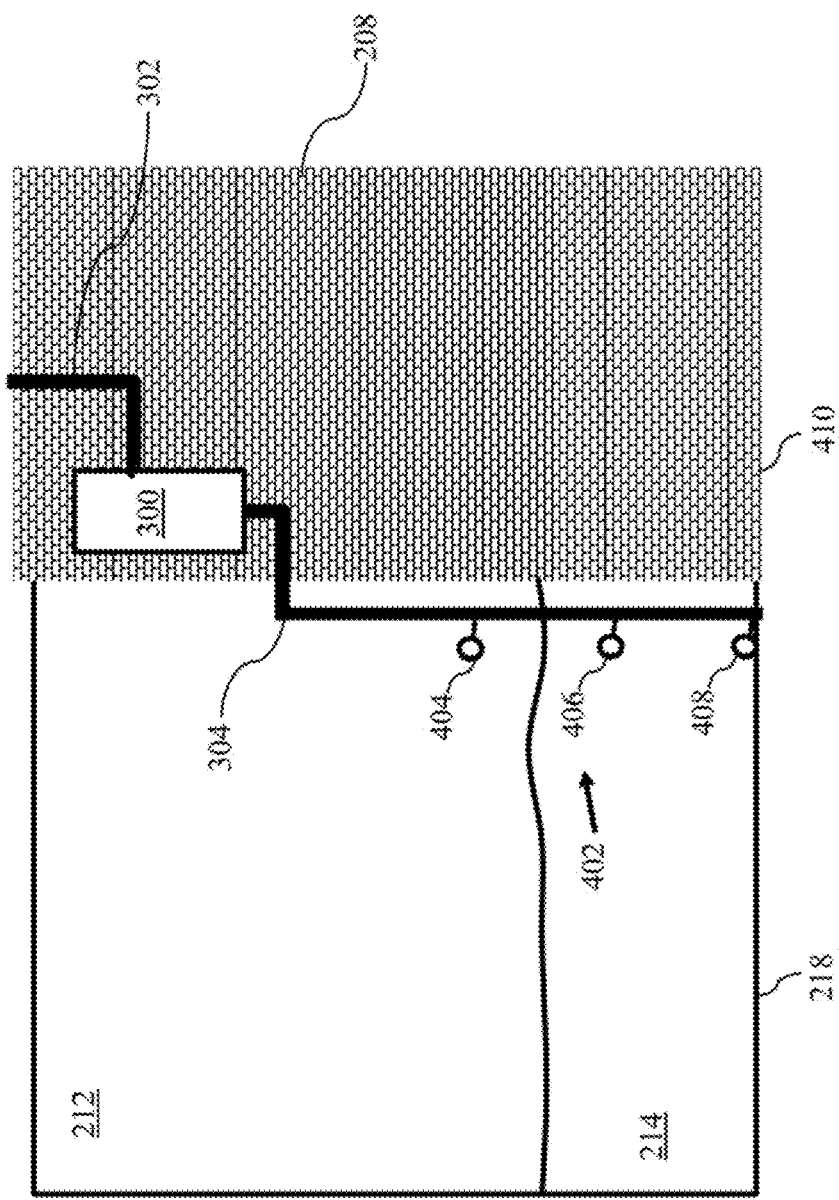

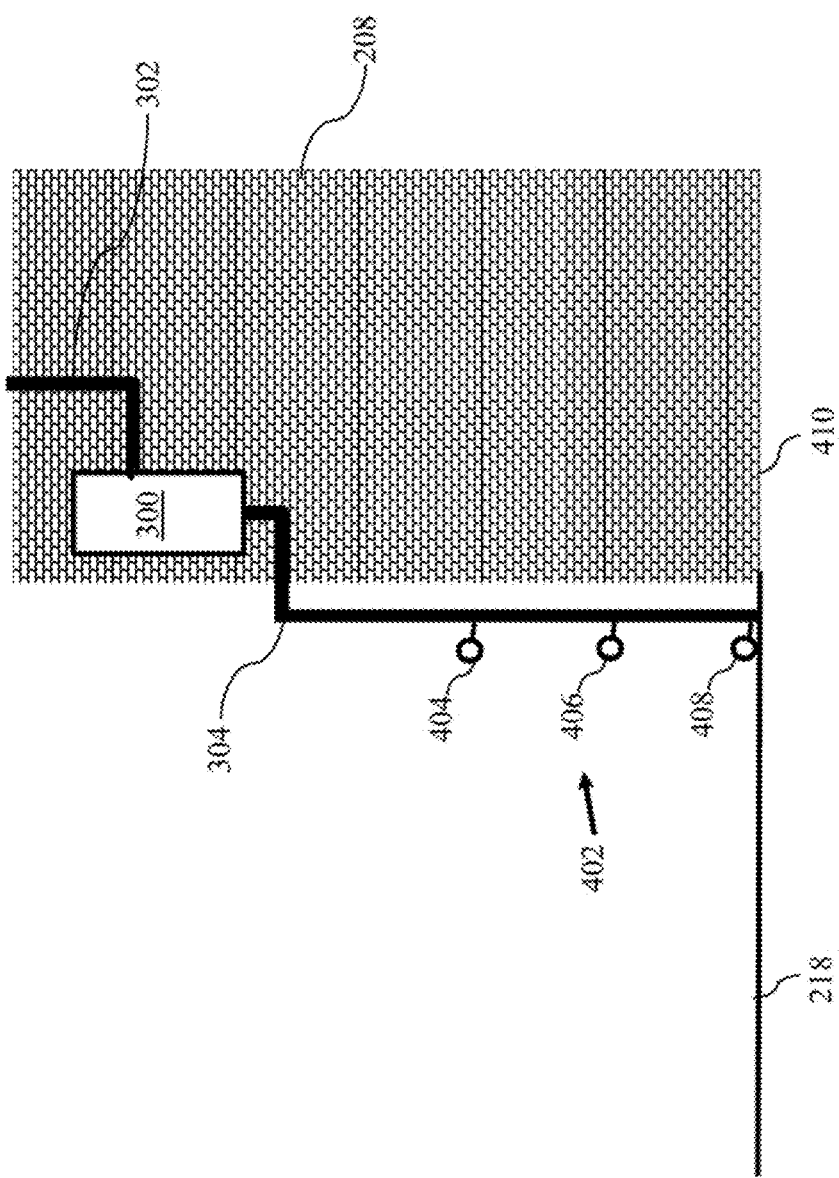

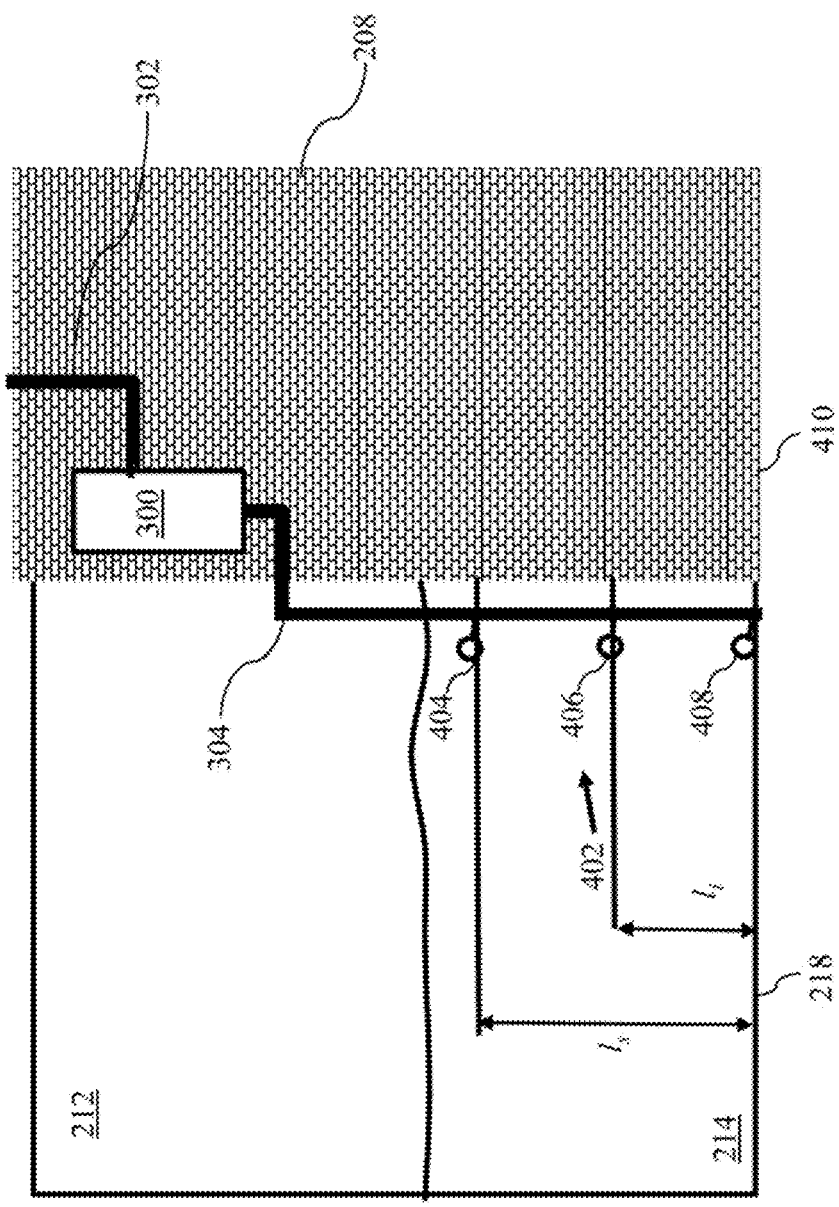

SYSTEM AND METHOD FOR MEASURING SOIL OR SEDIMENT LEVEL AND MONITORING HYDRAULIC DAMAGE

The present application claims priority from U.S. Provisional Application No. 62/895,134 filed Sep. 3, 2019, the entire disclosure of which is incorporated herein by reference.

BACKGROUND OF THE INVENTION

The present disclosure generally relates to systems and methods for monitoring hydraulic damage, or bridge scour.

Hydraulic damage or bridge scour is a common form of failure in bridges and other structures, which are temporarily or permanently exposed to water. The hydraulic damage happens when sand, din, material, or sediment around the structure (e.g., a bridge pier) is removed by water. In highway bridges, this issue is commonly referred to as bridge scour or bridge scouring. Most of the time, the issue happens to bridges and other structures in rivers, flood zones, or coastal areas.

There exists a need for a system and method for real-time monitoring of hydraulic damage.

SUMMARY OF THE INVENTION

An aspect of the present disclosure is drawn to a system for use with a structure having a portion thereof disposed on a surface. The system includes a conduit, a sensor system and a controller. The conduit is operable to be associated with the structure and being disposed in a direction normal to the surface. The sensor system may be affixed to the conduit and is operable to detect at least one of when a first portion of sediment on the surface and surrounding the structure is removed from a first area around the structure and when a second portion of sediment is deposited around the structure. The controller is in communication with the sensor component. When the sensor system is operable to detect when the first portion of sediment on the surface and surrounding the structure is removed from the first area around the structure, an initial length, of the conduit is disposed below the surface of the sediment on the surface and surrounding the structure at an initial time. When the sensor system is operable to detect when the second portion of sediment is deposited around the structure, the initial length, of the conduit is disposed above the surface at the initial time.

BRIEF DESCRIPTION OF THE DRAWINGS

The accompanying drawings, which are incorporated in and form a part of the specification, illustrate example embodiments and, together with the description, serve to explain the principles of the disclosure. A brief summary of the drawings follows:

FIG. 4A illustrates a pier of the bridge of FIG. 2 at a time $t_3$,
FIG. 4B illustrates the pier of FIG. 4A at a time $t_4$;
FIG. 6A illustrates the pier of the bridge of FIG. 2 at a time $t_5$;
FIG. 6C illustrates the pier of FIG. 6A at a time $t_7$;
FIG. 10B illustrates the example device of FIG. 10A at a time in.

DETAILED DESCRIPTION OF THE EMBODIMENTS

Figure 1A:
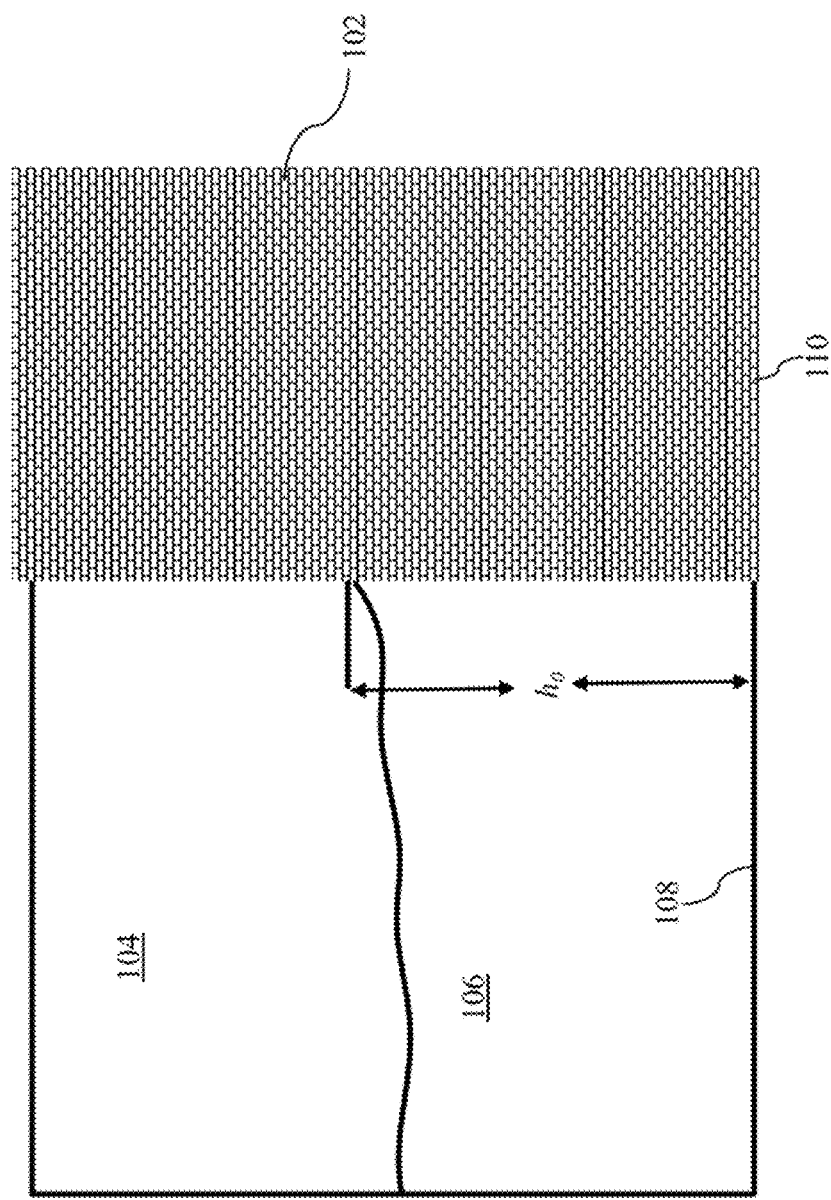
FIG. 1A illustrates a pier next to water at a time $t_0$.

FIG. 1A illustrates a pier 102 next to water 104 at a time $t_0$. As shown in the figure, water 104 is adjacent to pier 102, wherein water 104 includes sediment 106 resting on bedrock 108. A bottom 110 of pier 102 additionally rests on bedrock 108. At time sediment 106 has a height $h_0$ from bedrock 108 up to the side of pier 102.

Changes in current and turbulence may erode sediment 106 over time. This will be described with reference to FIGS. 1B-C.

Figure 1B:
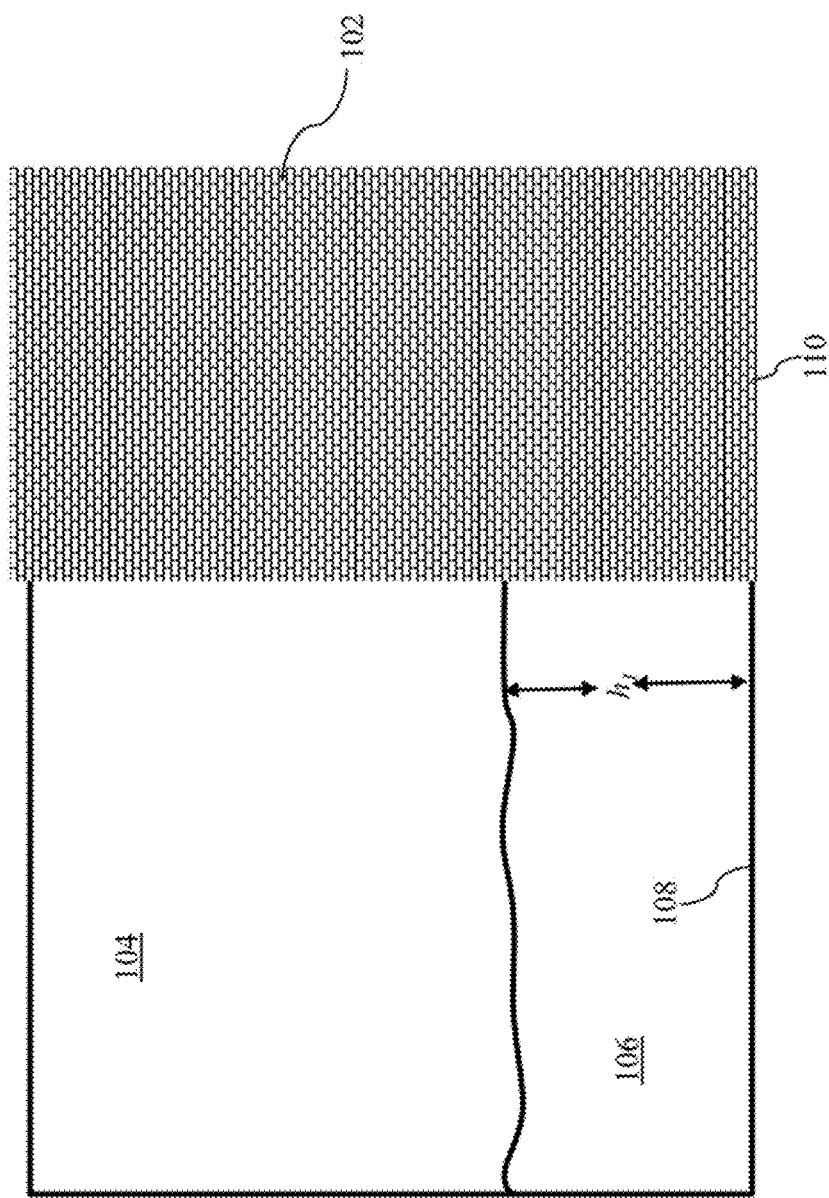
FIG. 1B illustrates the pier of FIG. 1A at a time $t_1$.

FIG. 1B illustrates pier 102 of FIG. 1A at a time $t_1$. As shown in the figure, water 104 is adjacent to pier 102, wherein at time $t_1$, sediment 106 has dropped to a height $h_1$ from bedrock 108 up to the side of pier 102. Because of various factors, including changes in current and turbulence, sediment 106 may continue to erode, as shown in FIG. 1C.

Figure 1C:
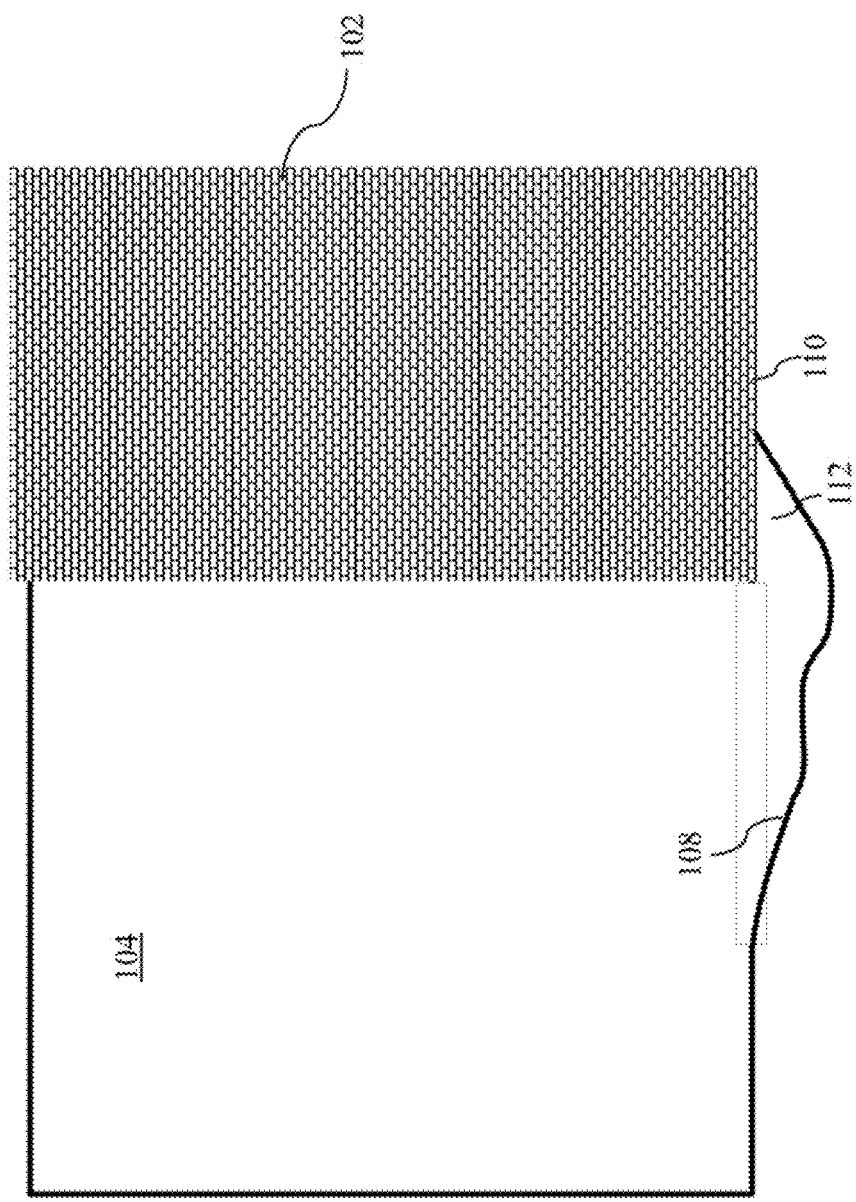
FIG. 1C illustrates the pier of FIG. 1A at a time $t_2$.

FIG. 1C illustrates pier 102 of FIG. 1A at a time $t_2$. As shown in the figure, water 104 and sediment 106 are no longer present. Further, bedrock 108 has eroded beneath bottom 110 of pier 102 so as to leave an excavated area 112 below bottom 110 of pier 102. The erosion of bedrock 108 may compromise the integrity of pier 102, thus compromising the integrity of the structure next to water 104. In the case of a bride, the bridge scours may ultimately render the bridge unsafe for travel.

A system and method in accordance with aspects of the present disclosure addresses these issues. In accordance with aspects of the present disclosure, a mechanical structure is used to measure soil or sediment level (position) around a structure. A main body may be secured to the structure, or mounted close to the structure. In addition, a sensor system determines whether the soil or sediment level changes. Once known, civil engineers and city planners may take necessary steps to rectify such scouring to maintain the integrity of structures exposed to running water. This will be described in greater detail below with reference to FIGS. 2-10B.

Figure 2:
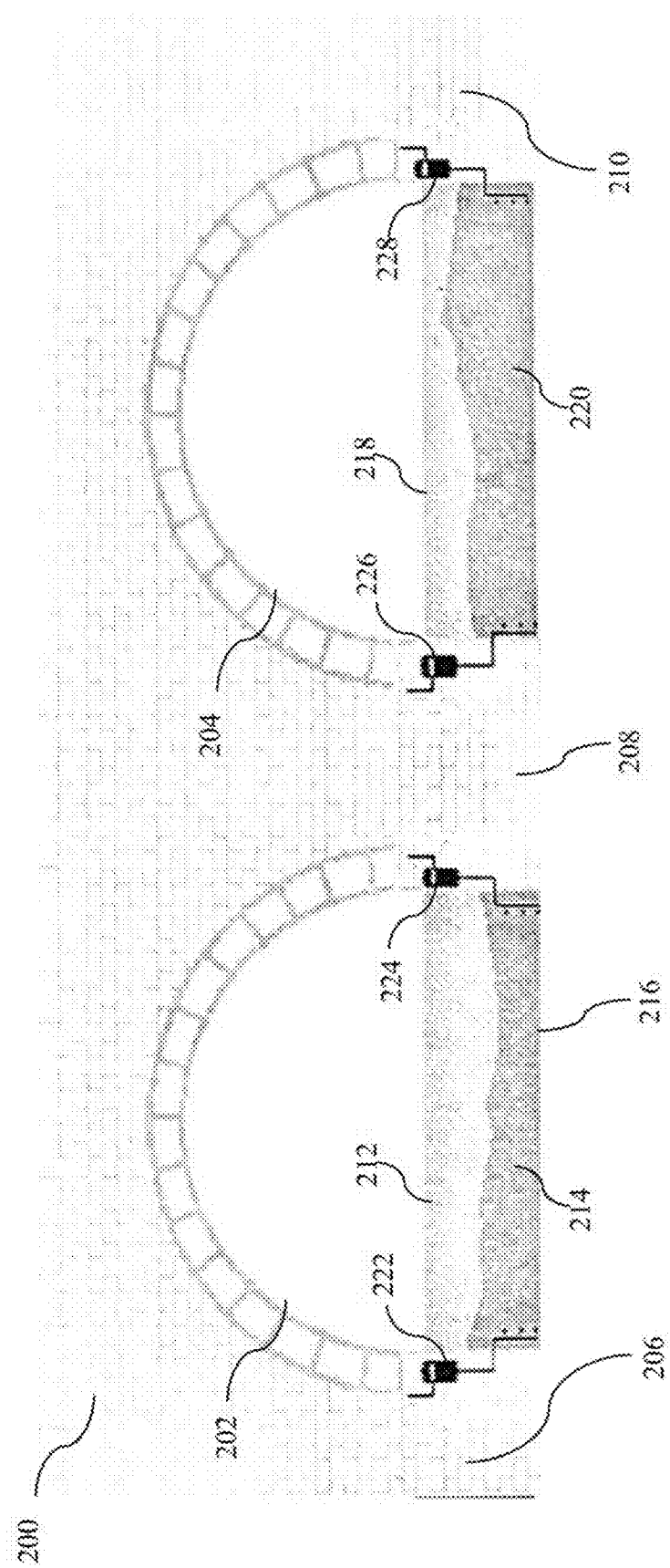
FIG. 2 illustrates a bridge having a system for measuring soil or sediment level and monitoring hydraulic damage in accordance with aspects of the present disclosure.

FIG. 2 illustrates a bridge 200 having a system for measuring soil or sediment level and monitoring hydraulic damage in accordance with aspects of the present disclosure.

As shown in the figure, bridge 200 has an arch 202 and an arch 204. Arch 202 spans from an abutment 206 to a pier 208, whereas arch 204 spans from pier 208 to an abutment 210. Abutment 206, pier 208 and abutment 210 are disposed on a bedrock 216. Water flows around pier 208 so as to flow through arch 202 as water 212 and so as to flow through arch 204 as water 218. Sediment 214 is deposited within arch 202 so as to cover a portion of abutment 206 and a portion of pier 208. Sediment 220 is deposited within arch 204 so as to cover a portion of abutment 210 and pier 208. A system 222 is disposed at abutment 206, a system 224 is disposed at arch 202 at pier 208, a system 226 is disposed at arch 204 at pier 208 and a system 228 is disposed at abutment 210. Each of systems 222, 224, 226 and 228 are able to measure soil or sediment level and monitor hydraulic damage in accordance with aspects of the present invention. This will be described in greater detail below with additional reference to FIGS. 3A-5B.

Figure 3:
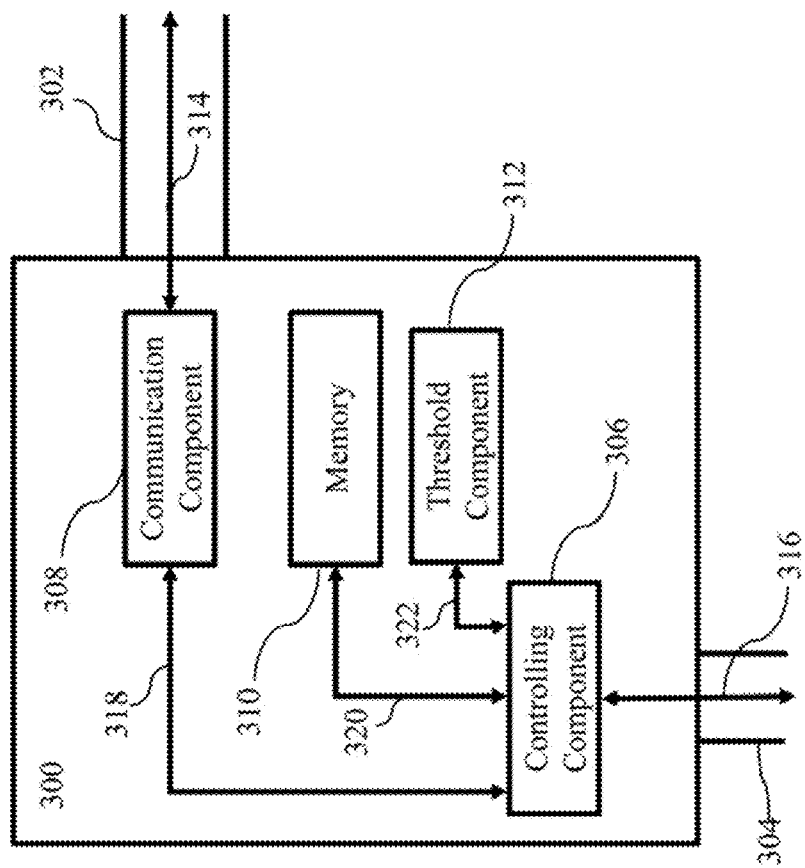
FIG. 3 illustrates a monitoring device of the system of FIG. 2.

FIG. 3 illustrates a monitoring device 300 of system 224 of FIG. 2.

As shown in FIG. 3, monitoring device 300 has conduit 302 connected thereto and conduit 304 connected thereto. Further, monitoring device 300 includes a controlling component 306, a communication component 308, a memory 310 and a threshold component 312.

In this example, monitoring device 300 is in communication with a communication line 314 within conduit 302 and is in communication with a communication line 316 within conduit 304. Each of communication lines 314 and 316 may be any known type of communication line, a non-limning example of which includes a copper wire. Conduit 302 protects communication line 314 from environmental elements, whereas conduit 304 protects communication line 316 from environmental elements.

In this example, controlling component 306, communication component 308, memory 310 and threshold component 312 are illustrated as individual devices. However, in some embodiments, at least two of controlling component 306, communication component 308, memory 310 and threshold component 312 may be combined as a unitary device. Further, iia some embodiments, at least one of controlling component 306, communication component 308, memory 310 and threshold component 312 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules mays be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. Ely way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Further, in this example, controlling component 306 is arranged to be in communication with communication component 308 via a communication channel 318, with memory 310 via a communication channel 320 and with threshold component 312 via a communication channel 322. Each of communication channel 318, communication channel 320 and communication channel 322 may be any known type of communication channel, non-limiting examples of which include a wired and a wireless communication channel.

The operation of system 224 and monitoring device 300 will now be described in greater detail with reference to FIGS. 4A-6B.

FIG. 4A illustrates pier 208 of bridge 200 of FIG. 2 at a time $t_3$.

As shown in the figure, monitoring device 300 is associated with pier 208. In this example, monitoring device 300 is disposed below water 212, however, monitoring device 300 may be disposed above or below water 212 and still operate in a manner in accordance with aspects of the present disclosure. Conduit 304 has sensor system 402 affixed thereto.

Conduit 304 is associated with pier 208 such that changes in sediment that may be detected by monitoring device 300 are similar to changes in sediment at pier 208. In some embodiments, conduit 304 is associated with pier 208 by being affixed to pier 208. In other embodiments, conduit 304 is associated with pier 208 by being disposed adjacent to pier 208 without being affixed to pier 208. In a non-limiting example described herein, conduit 304 is affixed to pier 208.

A "conduit" as used herein for conduit 304 may be any device or system that provides a structure to support sensor system 402 and to enable sensor system 402 to be disposed into sediment 214 down to bedrock 218, without digging or excavating sediment 214. Non-limiting examples of a conduit include a hollow cylinder, a hollow cylinder with holes disposed therein, a mesh cylinder, a u-shaped-cross-section length of material and a rod. One functionality of a conduit in accordance with aspects of the present disclosure includes being driven, e.g., by a driving member such as a hammer or pile driver, with a sensor system disposed thereon, down into an existing layer of sediment next to a pier. This functionality of a conduit avoids digging, or excavating, a portion of existing sediment next to a pier in order to place a sensor system that does not include a conduit. Such digging, or excavating, may disrupt the structure of the sediment next to a pier and may adversely accelerate hydraulic scouring next to the pier.

Sensor system 402 may be any device or system that is operable to detect at least one of when a first portion of sediment 214 on bedrock 218 and surrounding pier 208 is removed from a first area around pier 208 and when a second portion of sediment 214 is deposited around pier 208. The example of sediment being removed from a first area around pier 208 will be described with reference to FIGS. 4A-B, whereas an example of sediment being deposited around pier 208 will be described later with reference to FIGS. 6A-C.

In this example embodiment, sensor system 402 includes a plurality of sensors, which in this non-limiting example includes a sensor 404, a sensor 406 and a sensor 408. Conduit 304 is disposed so as to extend down to bedrock 218. Sensor 404 is disposed on conduit 304 at an initial length, $l_i$, below the surface of sediment 214 that is disposed on bedrock 218 and that is surrounding pier 208. This initial length, $l_i$, provides an initial baseline of the depth of sediment 214 that is disposed on bedrock 218 and that is surrounding pier 208. Other sensors may be disposed along conduit 304 down to bedrock 218 to provide incremental detectable distances as will be described in more detail below. In some embodiments, each of the plurality of sensors is separated by an equal distance, whereas in other embodiments, each of the plurality of sensors is not separated by an, equal distance.

Returning to FIG. 3, memory 310 has stored therein, position data for each of the plurality of sensors. In some embodiments, the respective position data is based on the respective distance of each sensor from bedrock 218. In some embodiments, the respective position data is based on the respective distance of each sensor from monitoring device 300.

Figure 5:
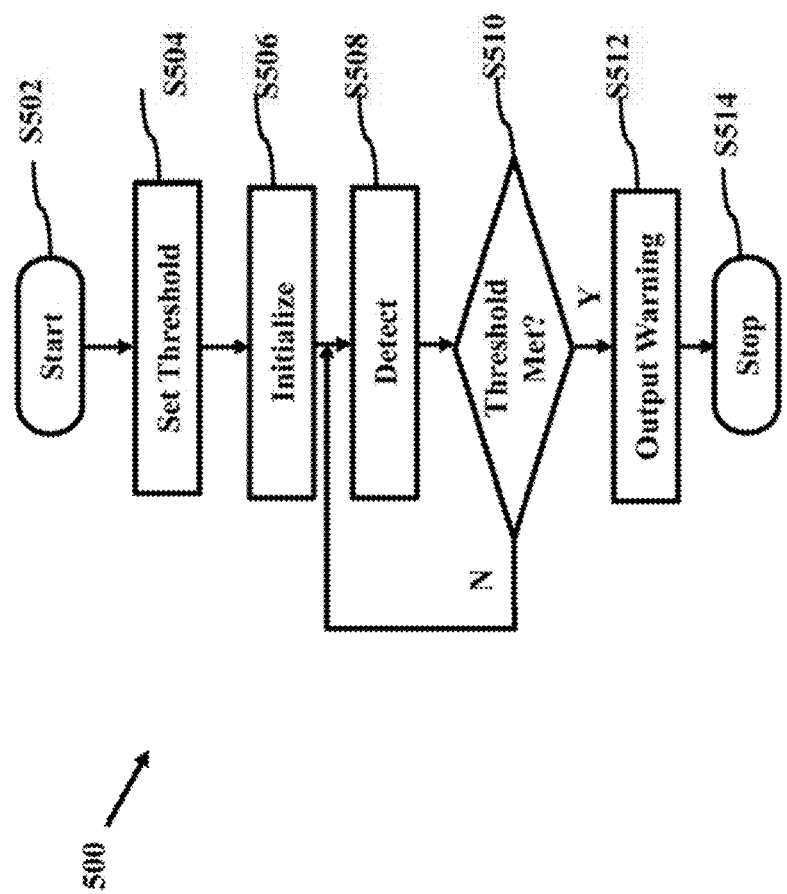
FIG. 5 illustrates an example method of operating a system for measuring soil or sediment level and monitoring hydraulic damage in accordance with aspects of the present disclosure.

FIG. 5 illustrates an example method 500 of operating a system for measuring soil or sediment level and monitoring hydraulic damage in accordance with aspects of the present.

DISCLOSURE

As shown in the figure, method 500 starts (S502) and a threshold is set (S504). For example, returning to FIG. 3, in an example embodiment, controlling component 306 sets a threshold value in threshold component 312. This threshold value may be associated with the maximum amount of sediment that might be removed.

For example returning to FIG. 4A, for purposes of discussion only, let the threshold value be associated with the level of sediment 214 dropping lower than the position of sensor 406. This threshold value may be associated with a parameter value that is detected by sensor 406 in the event that sensor 406 is excavated from sediment 214 so as to be exposed to water 212.

The sensors of sensor system 402 may be any type of sensor that is able to detect a presence, or removal, of sediment or soil, non-limiting examples of which include accelerometer sensors, motion sensors, position sensor, displacement sensor, tilt sensors, force sensors, flow sensors, ultrasonic sensors, light sensor, photo sensors, temperature sensors, magnetic sensors, magneto-resistive sensors, vibrating wire sensors, linear elastic structure sensors, temperature sensors, magnetic sensors, magneto-resistive sensors, pressure sensors and combinations thereof. The parameter value is associated with a respective type of sensor. Accordingly, the threshold value is similarly associated with a respective type of sensor. For example, in the case of a photo sensor, the threshold value may be in units of millivolts, wherein the light detected by a photo sensor is converted into millivolts, which is compared to threshold value of millivolts.

In some embodiments, sensor system 402 is operable to detect variations of mechanical properties, non-limiting examples of which include tilt, acceleration, vibration, flow and combinations thereof. However, in other embodiment, sensor system 402 is operable to detect temperature or temperature gradient so as to determine whether, at a given location, the structure is exposed or buried. Such detection is based on the fact that when buried, temperature variations are much smaller compared to the situation where at the location of at least one sensor of sensor system 402, the structure is not buried. For example, when a sensor or sensor system 402 measures temperature at buried locations, daily temperature changes are very small (about 2-3 degrees Fahrenheit per day). However, when temperature is measured at a location that is exposed, the daily temperature change is significantly larger, and it could exceeds 10-15 degrees Fahrenheit per day. Such variations are particularly larger when, at the location al the temperature sensor of sensor system 402, the structure is exposed to air. In addition to temperature, temperature gradient (the difference in temperature among different locations where measurement is done) can be used to detect locations where the structure is buried, exposed to air, or exposed to water. Furthermore, in another embodiment sensor system 402 is operable to detect magnetic properties of the surrounding environment in close proximity of it using magnetic or magneto-resistive sensors. In this embodiment, the sensor system 402 uses the fact that most often, soil and sediment have different magnetic properties compared to water or air. Therefore, exposure at location of a sensor changes in magnetic properties of the environment in close proximity of the sensor.

In some embodiments, each sensor is a motion sensor, wherein an actuator can be integrated to each motion sensor. Non-limiting example of actuators includes electric magnets, electric motors, and vibrator devices, and elements producing heat. In these example embodiments, the motion is induced by activating the actuator. When the motion sensor is buried under the soil or sediment, activation of an, actuator produces no or little movement. However, when a motion sensor is exposed, excitation of the actuator produces movement. By detecting the movement, the location of sediment may be detected. Likewise, when heat is used as the actuator, temperature around the sensor changes faster when the sensor is exposed compared to the case where the sensor is not exposed. A motion sensor in accordance with aspects of the present invention may detect whether a sensor is exposed, from sediment or water, by detecting a difference in the response to the actuation.

In particular, a sensor that is integrated with an actuator may have a first response when the sensor is not exposed, e.g., covered by water or sediment, and the sensor may have a second different response when the sensor is exposed, e.g., not covered by water or sediment. Accordingly, the sensor system may determine a change in exposure to water or sediment based on a change in the response to the sensor from the actuator. Consider the non-limiting example of a thermal sensor integrated with a thermal actuator. When such a thermal sensor is buried in sediment and actuated with an actuator, in this example a resistive heating element, the sediment will conduct the heat generated from the actuator relatively quickly. This thermal dissipation will be registered by the thermal sensor. On the other hand, if the thermal sensor is excavated and the water level drops such that the thermal sensor is exposed only to air, when actuated with the actuator, the air will conduct the generated heat from the actuator much more slowly as compared to the sediment. This thermal dissipation will also be registered by the thermal sensor. The change of thermal dissipation will be associated with the excavation of the thermal sensor, thus indicating that the sediment and water level has dropped.

In another embodiment, the sensors are optical sensors. Each optical sensor includes a light detector, which detects presence of light. The light detector detects no light when it is buried in sediment. However, when it is out of soil or sediment, it detects natural light or light that may be emitted from a corresponding small light source close by (such as a light emitting diode or an LED) which may a part of the unit. In addition, in these embodiments, the electrical wires can be replaced by optical fibers or a light guide, and the light may be carried to from the light source to each sensing location using the light guide and the light from each sensing location is carried using the light guide from the sensing location to an optical sensor at monitoring device 300.

In yet other embodiments, other variations of sensors may be used to detect where sediment inside or outside the conduit stand. These alternative embodiments include a vibrating wire (or string), an array of ultrasonic sensors and a linear elastic structure.

A vibrating wire or string may be disposed inside the conduit (or closely outside it), wherein natural frequency of vibration changes depending on the length of the wire that is buried within the sediment. Using this method, the portion of the string that is not buried is free to vibrate. The natural frequency is function of mass of unit length, tensile force and the length that is free to vibrate. By measuring natural frequency of the string, by any known method, e.g., using an accelerometer, and knowing the mass of unit length, the length of the string that is outside the sediment can be measured. In this embodiment, conduit 304 may have holes in its exterior to permit the sediment level inside it to be the same as the level outside.

One or an array of ultrasonic sensors may be used to measure reflection from the surrounding medium to detect whether or not, at a given location, conduit 304 is buried, in, this embodiment, conduit 304 may have holes, an opening or openings in its exterior letting the sediment level inside it to be the same as the level outside.

A linear elastic structure (such as a string or rubber-like material) may be used inside conduit 304 with several holes in exterior. The elastic structure may be regularly pulled at the top location by a small amount using an actuation force and then released. By measuring the amount of displacement at the top per unit force or the amount of force per unit of displacement, the length of the elastic structure that is out of water may be estimated. In this embodiment, conduit 304 may have holes in its exterior letting the sediment level inside it to be the same as the level outside.

Returning to FIG. 5, after the threshold is set (S504), the system is initialized (S506). For example, returning, to FIG. 3, in an example embodiment, controlling component 306 obtains initial values for parameters detected by the sensory system.

Figure 6B:
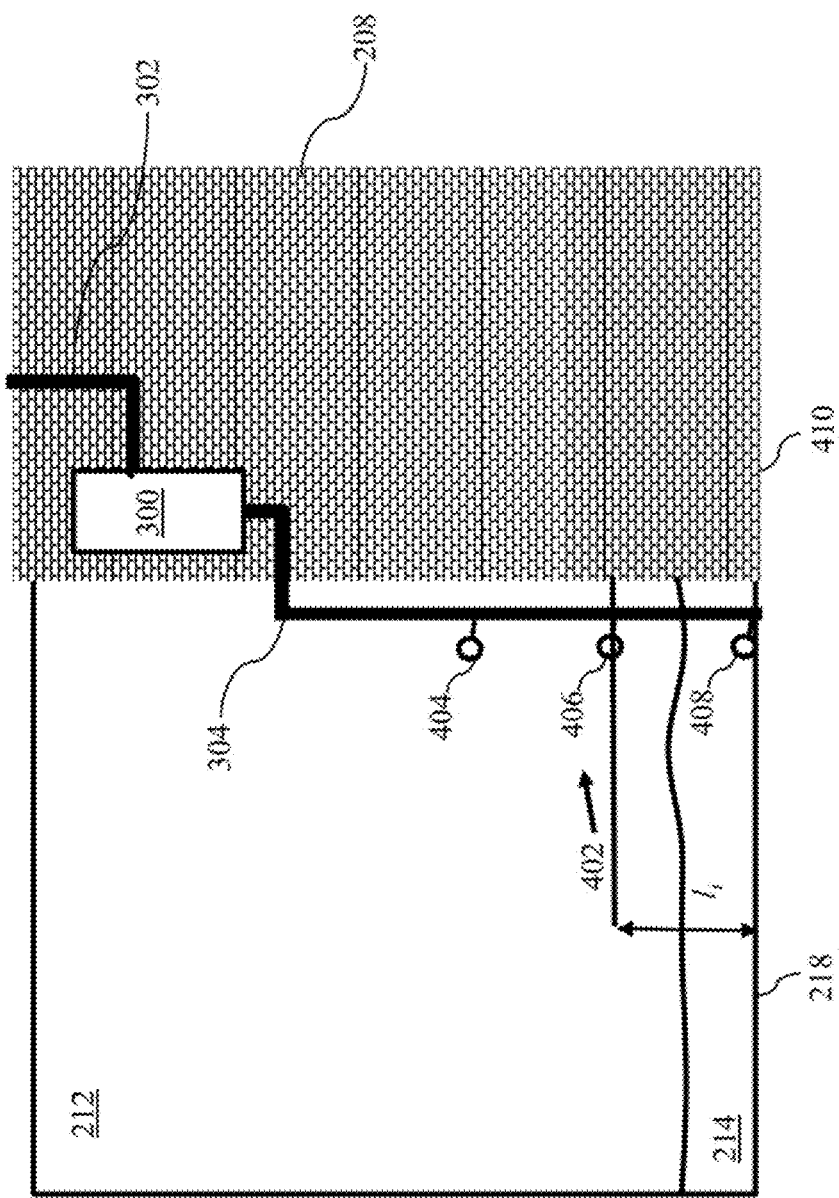
FIG. 6B illustrates the pier of FIG. 6A at a time $t_6$.

For example, returning to FIG. 4A, in this example embodiment and for purposes of discussion only, let time $t_3$ be the time that the system is installed on pier 410. In this case, conduit 304 extends through water 212, down through sediment 214 and to bedrock 218. Sensor 404 is disposed at distance $l_t$ from the top of sediment 214 at pier 208, whereas sensor 406 is disposed at a distance $l_x$ from the top of sediment 214 at pier 208, and whereas sensor 408 is disposed at bedrock 218. Each of sensors 404, 406 and 408 will take an initial reading, which is communicated to memory 310 within monitoring device 300 via communication line 316 within conduit 304. These initial readings provide a baseline for which future readings will be compared in order to determine whether sediment 214 is removed from or deposited next to pier 208. In the ease of FIG. 4A, the baseline readings will determine whether sediment 214 is removed from pier 208. However, as shown in FIGS. 6A-C, the initial readings will determine whether sediment 214 is deposited next to pier 208, FIG. 6A illustrates pier 208 of bridge 200 of FIG. 2 at a time $t_5$.

In this example, there is no water or sediment on bedrock 218 next to pier 208. For purposes of discussion, let pier 208 be next to a river bed that is dry during the fall and winter months, but fills with rushing water during the spring thaw from nearby mountains. Let time $t_5$ be in the winter where there is no water.

In this example embodiment and for purposes of discussion only, let time $t_5$ be the tune that the system is installed on pier 410. In this case, conduit 304 extends in the open air down to bedrock 218. Each of sensors 404, 406 and 408 will take an initial reading, which is communicated to memory 310 within monitoring device 300 via communication line 316 within conduit 304. These initial readings provide a baseline for which future readings will be compared in order to determine whether sediment 214 is deposited next to pier 208.

Returning to FIG. 5, after the system is initialized (S506), a signal is detected (S508). For example, returning to FIG. 3, in an example embodiment, sensor system 402 is operable to provide a removal-depth signal to controlling component 306, wherein the removal-depth signal is based on the portion of the sediment that is removed from the area around sensor system 402 when the portion of the surrounding sediment is removed from the area around sensor system 402.

FIG. 4B illustrates pier 208 of FIG. 4A at a time $t_4$. As shown in the figure, at this point in time, the level of sediment 214 has dropped below sensor 404 so that sensor 404 is now exposed in water 212. Sensor 406 and sensor 408 remain buried in sediment 214. Accordingly, a portion of sediment 214 is removed from the area around sensor system 402, namely the area around sensor 404.

Each of sensors 404, 406 and 408 sends detection signals to controlling component 306 within monitoring device 300 via communication hue 316 within conduit 304.

In some embodiments, each sensor within sensor system 402 provides a respective signal to monitoring device 300 at periodic intervals, e.g., hourly, daily, weekly, etc. In some embodiments, each sensor within sensor system 402 provides a respective signal to monitoring device 300 only if there is a change in the state of the sensor, e.g., the sensor becomes excavated from sediment so as to be exposed to water or the sensor becomes buried by deposited sediment, in some embodiments, controlling component 306 of monitoring device 300 pings, e.g., periodically, each sensor within sensor system 402 to instruct each sensor within sensor system 402 to provide a respective signal.

The combination of these detection signals may be considered a removal-depth signal because they will reflect a depth amount of sediment that has been removed from around sensor system 402, when sediment has been removed from around sensor system 402. The combination of these detection signals may be considered a deposit-depth signal because they will reflect a depth amount of sediment that has been deposited around sensor system 402, when sediment has been deposited around sensor system 402. Controlling component 306 then converts these received signals into respective data values for storage into memory 310.

Returning to FIG. 3, controlling component 306 then determines whether sediment is removed from an area around the structure or whether sediment is deposited to an area around the structure. For example, returning to FIGS. 4A-B, sensor 404 is no longer covered by sediment 214 at time $t_4$, which is an indication that sediment has been removed. This removal of sediment is recognized through controlling component 306 comparing the data value associated with sensor 404 at time $t_3$ (associated with FIG. 4A), which has been stored in memory 310 with the data value associated with sensor 404 at time $t_4$ (associated with FIG. 4B), which also has been stored in memory 310. On the other hand, as shown in FIGS. 6A-C, sensors 404, 406 and 408 become covered over time.

FIG. 6B illustrates pier 208 of FIG. 6A at a time $t_4$. As shown in the figure, sensor 408 is now covered by sediment 214, whereas sensors 406 and 404 are covered by water 212. These differences will be evident by the sensor signals as compared to those respective signals as provided at time with reference to FIG. 6A, when no, sensor was covered by water or sediment.

Further, in this example, FIG. 6C illustrates pier 208 of FIG. 6A at a time $t_7$. As shown in the figure, sensors 408, 406 and 404 are now covered by sediment 214. The differences in sensor readings from sensors 406 and 404 will be evident by the sensor signals as compared to those respective signals as provided at time $t_6$, with reference to FIG. 6B, when only water covered sensors 406 and 404.

This deposit of sediment is recognized through controlling component 306 comparing the data values associated with sensors 404, 406 and 408 at time $t_5$ (associated with FIG. 6A), which has been stored in memory 310 with the data values associated with sensors 404, 406 and 408 at time $t_6$ (associated with FIG. 6B), which also has been stored in memory 310, and through controlling component 306 comparing the data values associated with sensors 404, 406 and 408 at time $t_6$ (associated with FIG. 6B), which has been stored in memory 310 with the data values associated with sensors 404, 406 and 408 at time $t_7$ (associated with FIG. 6C), which also has been stored in memory 310.

Returning to FIG. 5, after the signal is detected (S508), it is determined whether the threshold is met (S510). For example, returning to FIG. 3, in an example embodiment, threshold component 312 has a predetermined threshold stored therein.

In some embodiments, one predetermined threshold is based on an amount of sediment that is deposited around pier 208 as detected by sensor system 402 over a predetermined time period. In some embodiments, another predetermined threshold is based on an amount of sediment that is removed from around pier 208 as detected by sensor system 402 over a predetermined time period. In these embodiments, sensor system 402 is used to detect a real time change in sediment.

In some embodiments, one predetermined threshold is based on a moving average of an amount of sediment that is deposited around pier 208 as detected by sensor system 402 over a predetermined moving average time period. In some embodiments, another predetermined threshold is based on a moving average of an amount of sediment that is removed from around pier 208 as detected by sensor system 402 over a predetermined moving average time period. In these embodiments, sensor system 402 is used to detect an average change in sediment so as not to place too much concern on day-to-day changes in sediment. For example, average changes over a weekly or monthly period may provide greater information related to overall bridge scour.

Controlling component 306 then compares, via a comparing component disposed therein, data values associated with sensors 404, 406 and 408, as provided by memory 310, with the threshold provided by threshold component 312. In a non-limiting example embodiment, the threshold may be based on a change of sediment over a change in time, e.g., if more than two (2) meters of sediment are removed over a two (2) day period, then there may be cause for alarm with respect to overall bridge scour. In another non-limiting example embodiment, the threshold may be based on a cyclic change of sediment, e.g., if more than one (1) meter of sediment is cyclically removed and the replaced more than three times over a month, then there may be cause for alarm with respect to overall bridge scour.

Returning to FIG. 5, if it is determined that the threshold is not met (N at S510), then the presence or removal of sediment is again detected (return to S508). However, if it is determined that the threshold is met (Y at S510), then a warning is output (S512). For example, returning to FIG. 3, in an example embodiment, the comparing component of controlling component 306 outputs a warning signal based on the removal depth signal and a predetermined threshold in the situation where sediment has been removed from around pier 208. In another example embodiment, the comparing component of controlling component 306 outputs a warning signal based on the deposit-depth signal and a predetermined threshold in the situation where sediment has been deposited around pier 208.

The warning signal may then be provided to communication component 308, which is then communicated from monitoring device 300 via communication line 314. The warning signal may then be provided to a monitoring station (not shown) or headend by known communication methods, non-limiting examples of which include a local area network, a wireless network and the Internet. The warning signal may then inform a user of potential risks of bridge scour as a result of too much depletion of sediment around pier 208, too much deposit of sediment around pier 208, and too great a change of sediment around pier 208.

Returning to FIG. 5, after a warning is output (S512), method 500 stops (S514).

The example embodiments discussed above with reference to FIGS. 4A-6C are drawn to a sensor system having a plurality of spaced sensors that are collectively able to detect whether sediment is deposited or removed from around pier 208. However, other example embodiments of sediment detectors may be used in accordance with aspects of the present disclosure. Some non-limiting examples will now be described with reference to FIGS. 7-10B.

Figure 7:
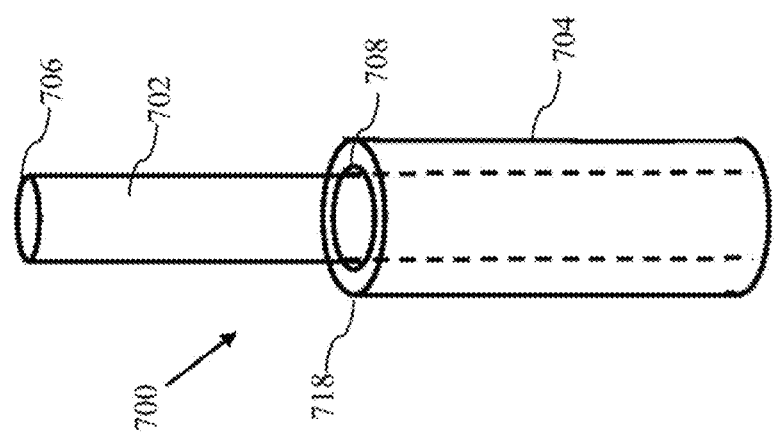
FIG. 7 illustrates another example device for measuring soil or sediment level and monitoring hydraulic damage in accordance with aspects of the present disclosure.

FIG. 7 illustrates another example device 700 for measuring soil or sediment level and monitoring hydraulic damage in accordance with aspects of the present disclosure.

As shown in the figure, device 700 includes an inner member 702 and an outer member 704, wherein inner member 702 is slidable through outer member 704. In this non-limiting example, inner member 702 is cylindrically shaped and has an outer circumference 706, whereas outer member 704 is tubular in shape and having an inner circumference 708, that is able to slidably fit inner member 702 therein, and an outer circumference 710.

Device 700 uses a mechanical structure to measure soil or sediment level (position) around a structure, e.g., pier 208. In an example embodiment, outer member 704 may be secured to pier 208, or mounted close to pier 208. Inner member 702 moves if the soil or sediment level changes. The operation of device 700 will be described with reference to FIGS. 8A-B.

Figure 8B:
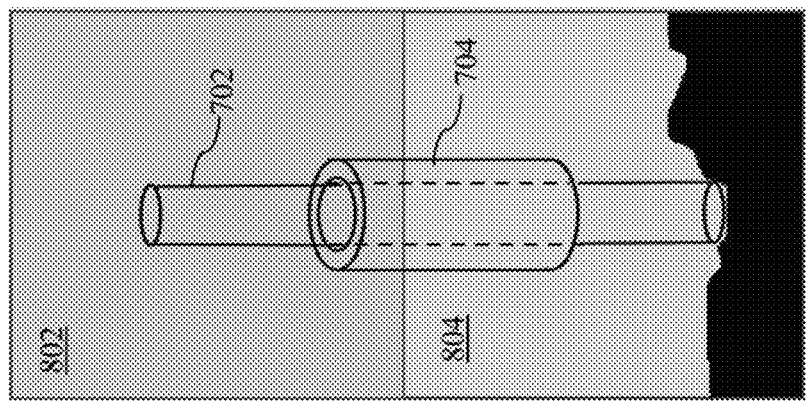
FIG. 8B illustrates the example device of FIG. 7 at a time $t_9$.
Figure 8A:
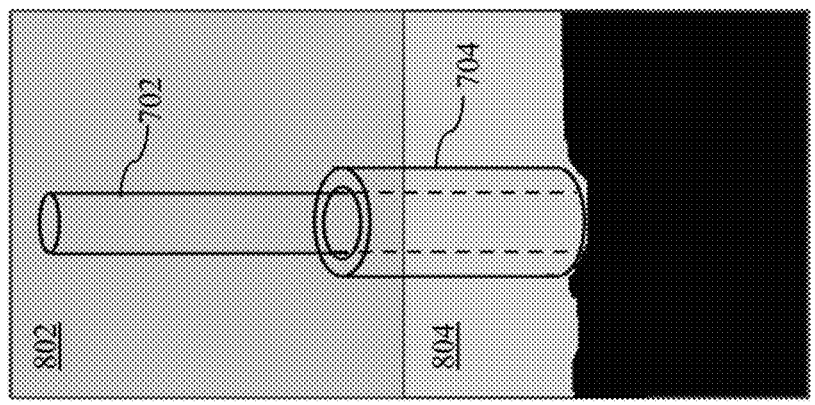
FIG. 8A illustrates the example device of FIG. 7 at a time $t_8$.

FIG. 8A illustrates example device 700 of FIG. 7 at a time $t_8$. As shown in FIG. 8A, device 700 is disposed so as to sit atop sediment 806 within water 804. In this example, device 700 is mounted to pier 208 (not shown) such that outer member 704 is mounted at the level of sediment 806. In this manner, inner member 702 is additionally sitting atop the level of sediment 806. If the level of sediment 806 lowers, then inner member 702 will slide down through outer member 704. This is shown in FIG. 8B.

FIG. 8B illustrates example device 700 of FIG. 7 at a time $t_9$. As shown in FIG. 8B, the level of sediment 806 has lowered as compared to that of FIG. 8A. As outer member 704 is fixed to pier 208, the height of outer member 704 remains fixed. However, inner member 702 is vertically slidable relative to outer member 704. In this case, because inner member 702 is resting on sediment 806, inner member 702 slides down as the level of sediment 806 lowers. The actual measurement of motion of inner member 702 will be described with reference to FIG. 9.

Figure 9:
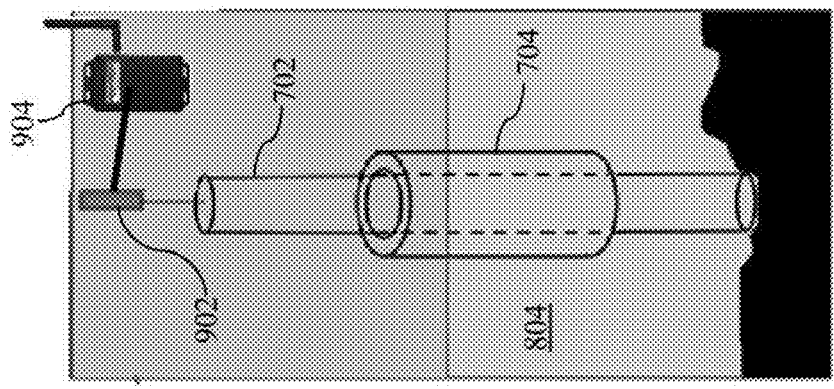
FIG. 9 illustrates the example device of FIG. 7 incorporated into a system for measuring soil or sediment level and monitoring hydraulic damage in accordance with aspects of the present disclosure.

FIG. 9 illustrates example device 700 of FIG. 7 incorporated into a system for measuring soil or sediment level and monitoring hydraulic damage in accordance with aspects of the present disclosure. As shown in FIG. 9, device 700 is connected to a position measurement device 902, non-limiting examples of which include a linear or rotary potentiometer, wherein the movement of inner member 702 is measured by position measurement device 902. In addition, communication component 308 of monitoring device 300 may include a wireless transmitter to report the position inner member 702 as measured by position measurement device 902, which indicates the height of sediment 806 close to pier 208.

Another example device for measuring soil or sediment level and monitoring hydraulic damage in accordance with aspects of the present disclosure will now be described with reference to FIGS. 10A-B.

Figure 10B:
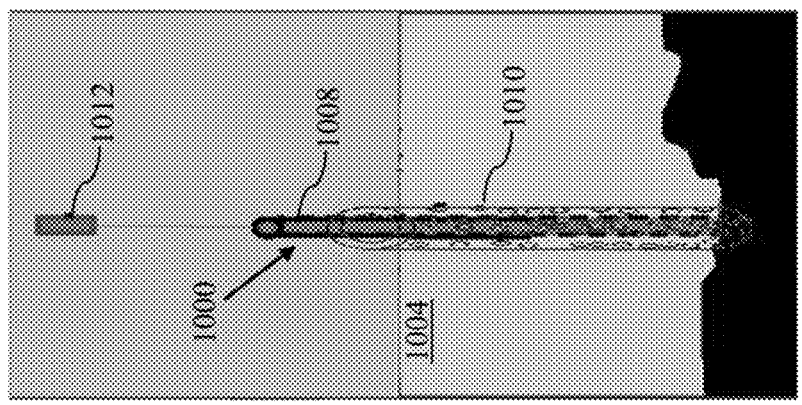
Figure 10A:
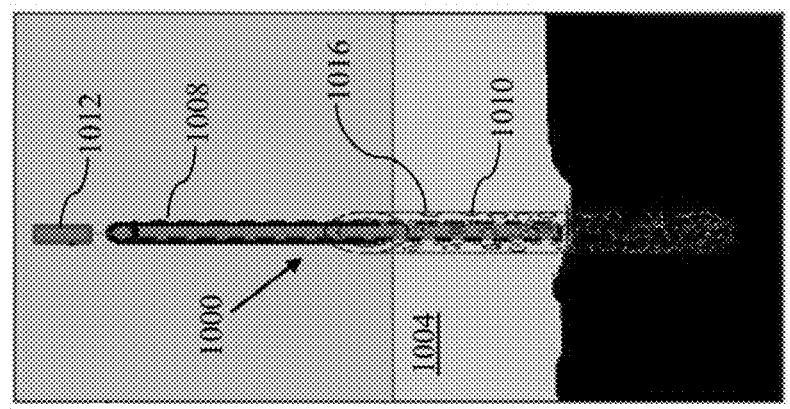
FIG. 10A illustrates another example device for measuring soil or sediment level and monitoring hydraulic damage at a time $t_9$ in accordance with aspects of the present disclosure.

FIG. 10A illustrates another example device 1000 for measuring soil or sediment level and monitoring hydraulic damage at a time, $t_{10}$ in accordance with aspects of the present disclosure.

As shown in the figure, device 1000 is disposed in water 1004 and is partially embedded in sediment 1006. Device 1000 includes an inner member 1008 and an outer member 1010. Inner member 1008 is slidably movable through outer member 1010. Outer member 1010 is perforated so as to have many holes in its exterior. The pipe or guide element may be installed on a structure, e.g. pier 208, such that perforated outer member 1010 is driven through sediment 1006. After installation, the pipe is filled with a fine grain material, a non-limiting example of which includes sand. Then inner member 1008 may be inserted into the pipe. The fine grain material stands at level of the surrounding sediment.

FIG. 10B illustrates example device 1000 of FIG. 10A at a time $t_{11}$. As shown in FIG. 10B, when sediment 1006 is scoured or washed away, the sand will additionally be washed away through the perforations in outer member 1010, such that inner member 1008 will moves down inside outer member 1010. The movement is measured using a displacement measurement device 1012, or it can be observed visually.

The foregoing description of various embodiments has been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed as new and desired to be protected by Letters Patent of the United States is:

1. A system for use with a structure having a portion thereof disposed on a surface, said system comprising:
   a conduit operable to be associated with the structure and being disposed in a direction normal to the surface;
   a sensor system affixed to said conduit and being operable to detect at least one of when a first portion of sediment on the surface and surrounding the structure is removed from a first area around the structure and when a second portion of sediment is deposited around the structure; and
   a controller in communication with said sensor system, wherein when said sensor system is operable to detect when the first portion of sediment on the surface and surrounding the structure is removed from the first area around the structure, an initial length, b, of said conduit is disposed below the surface of the sediment on the surface and surrounding the structure at an initial time, wherein when said sensor system is operable to detect when the second portion of sediment is deposited around the structure, the initial length, $l_i$, of said conduit is disposed above the surface at the initial time, wherein said sensor system comprises a plurality of acceleration sensors, wherein said sensor system further comprises a plurality of actuators, each being operable to actuate a respective one of said plurality of acceleration sensors to detect removal or deposition of sediment around the respective one of said plurality of acceleration sensors, wherein each of said plurality of actuators comprises one of a vibrator device and an elastic structure, and wherein said sensor system is operable to detect when the first portion of sediment on the surface and surrounding the structure is removed from the first area around the structure based on a change in a response to an actuation of one of said plurality of acceleration sensors by a respective one actuator of said plurality of actuators.

2. The system of claim 1, wherein said plurality of acceleration sensors comprises a first acceleration sensor, wherein when said sensor system is operable to detect when the first portion of sediment on the surface and surrounding the structure is removed from the first area around the structure, said first acceleration sensor is affixed on said conduit so as to be disposed at the initial length, $l_i$, below the surface of the surrounding sediment at the initial time, and wherein when said sensor system is operable to detect when the first portion of sediment on the surface and surrounding the structure is removed from the first area around the structure, said first acceleration sensor is operable to detect when the portion of the surrounding sediment is removed from the area around the structure by detecting when a first portion of the surrounding sediment is removed from an area around said first acceleration sensor.

3. The system of claim 2, wherein said plurality of acceleration sensors additionally comprises a second acceleration sensor, wherein when said sensor system is operable to detect when the first portion of sediment on the surface and surrounding the structure is removed from the first area around the structure, said second acceleration sensor is affixed on said conduit so as to be disposed at a second length, $l_s$, below the sediment at the initial time, wherein when said sensor system is operable to detect when the first portion of sediment on the surface and surrounding the structure is removed from the first area around the structure, $l_i < l_s$, and wherein when said sensor system is operable to detect when the first portion of sediment on the surface and surrounding the structure is removed from the first area around the structure, said second acceleration sensor is operable to detect when the portion of the surrounding sediment is removed from the area around the structure by detecting when a second portion of the surrounding sediment is removed from an area around said second acceleration sensor.

4. The system of claim 1, wherein when said sensor system is operable to detect when the first portion of sediment on the surface and surrounding the structure is removed from the first area around the structure, said sensor system is operable to provide a removal-depth signal to said controller, the removal-depth signal being based on the portion of the sediment that is removed from the area around said sensor system when the portion of the surrounding sediment is removed from the area around said sensor system, and wherein when said sensor system is operable to detect when the first portion of sediment on the surface and surrounding the structure is removed from the first area around the structure, said controller comprises a comparing component operable to output a warning signal based on the removal-depth signal and a predetermined threshold.

5. The system of claim 4, wherein when said sensor system is operable to detect when the first portion of sediment on the surface and surrounding the structure is removed from the first area around the structure, said sensor system is operable to provide a first removal-depth signal to said controller at a first time, $t_1$, wherein when said sensor system is operable to detect when the first portion of sediment on the surface and surrounding the structure is removed from the first area around the structure, said sensor system is further operable to provide a second removal-depth signal to said controller at a second time, $t_2$, and wherein said controller comprises a comparing component operable to output a warning signal based on the first removal-depth signal, the second removal-depth signal and a moving average predetermined threshold.

6. The system of claim 1, wherein said plurality of acceleration sensors comprises a first acceleration sensor, wherein when said sensor system is operable to detect when the second portion of sediment is deposited around the structure, said first acceleration sensor is affixed on said conduit so as to be disposed at the initial length, $l_i$, above the surface at the initial time, and wherein when said sensor system is operable to detect when the second portion of sediment is deposited around the structure, said first acceleration sensor is operable to detect when the second portion of sediment is deposited around the structure.

7. The system of claim 6, wherein said plurality of acceleration sensors additionally comprises a second acceleration sensor, wherein when said sensor system is operable to detect when the second portion of sediment is deposited around the structure, said second acceleration sensor is affixed on said conduit so as to be disposed at a second length, $l_s$, above the surface at the initial time, wherein when said sensor system is operable to detect when a second portion of sediment is deposited around the structure, $l_i < l_s$, and wherein when said sensor system is operable to detect when the second portion of sediment is deposited around the structure, said second acceleration sensor is operable to detect when the second portion of sediment is deposited around the structure around the structure by detecting when a third portion of sediment is deposited around said second acceleration sensor.

8. The system of claim 1, wherein when said sensor system is operable to detect when the second portion of sediment is deposited around the structure, said sensor system is operable to provide a deposit-depth signal to said controller, the deposit-depth signal being based on the second portion of the sediment that is deposited around the structure when the second portion of the sediment is deposited around the structure, and wherein when said sensor system is operable to detect when the second portion of sediment is deposited around the structure, said controller comprises a comparing component operable to output a warning signal based on the deposit-depth signal and a predetermined threshold.

9. A method comprising:

affixing a sensor system to a conduit;

associating the conduit with a structure, having a portion thereof disposed on surface, such that the conduit is disposed in a direction normal to the surface;

detecting, via the sensor system, at least one of when a first portion of sediment on the surface and surrounding the structure is removed from a first area around the structure and when a second portion of sediment is deposited around the structure; and wherein when the sensor system is operable to detect when the first portion of sediment on the surface and surrounding the structure is removed from the first area around the structure, an initial length, $l_i$, of the conduit is disposed below the surface of the sediment on the surface and surrounding the structure at an initial time, wherein when the sensor system is operable to detect when the second portion of sediment is deposited around the structure, the initial length, $l_i$, of the conduit is disposed above the surface at the initial time, wherein the sensor system comprises a plurality of acceleration sensors, wherein the sensor system further comprises a plurality of actuators, each being operable to actuate a respective one of the plurality of acceleration sensors to detect removal or deposition of sediment around the respective one of the plurality of acceleration sensors, wherein each of the plurality of actuators comprises one of a vibrator device and an elastic structure, and wherein said detecting when the first portion of sediment on the surface and surrounding the structure is removed from the first area around the structure is based on a change in a response to an actuation of one of the plurality of acceleration sensors by a respective one actuator of the plurality of actuators.

10. The method of claim 9, wherein the plurality of acceleration sensors comprises a first acceleration sensor, wherein when the sensor system is operable to detect when the first portion of sediment on the surface and surrounding the structure is removed from the first area around the structure, the first acceleration sensor is affixed on the conduit so as to be disposed at the initial length, $l_i$, below the surface of the surrounding sediment at the initial time, and wherein when the sensor system is operable to detect when the first portion of sediment on the surface and surrounding the structure is removed from the first area around the structure, the first acceleration sensor is operable to detect when the portion of the surrounding sediment is removed from the area around the structure by detecting when a first portion of the surrounding sediment is removed from an area around the first acceleration sensor.

11. The method of claim 10, wherein the plurality of acceleration sensors additionally comprises a second acceleration sensor, wherein when the sensor system is operable to detect when the first portion of sediment on the surface and surrounding the structure is removed from the first area around the structure, the second acceleration sensor is affixed on the conduit so as to be disposed at a second length, $l_s$, below the sediment at the initial time, wherein when the sensor system is operable to detect when the first portion of sediment on the surface and surrounding the structure is removed from the first area around the structure, $l_s < l_i$, and wherein when the sensor system is operable to detect when the first portion of sediment on the surface and surrounding the structure is removed from the first area around the structure, the second acceleration sensor is operable to detect when the portion of the surrounding sediment is removed from the area around the structure by detecting when a second portion of the surrounding sediment is removed from an area around the second acceleration sensor.

12. The method of claim 9, further comprising:

providing, via the sensor system and when the sensor system is operable to detect when the first portion of sediment on the surface and surrounding the structure is removed from the first area around the structure, a removal-depth signal to the controller, the removal-depth signal being based on the portion of the sediment that is removed from the area around the sensor system when the portion of the surrounding sediment is removed from the area around the sensor system; and outputting, via a comparing component of the controller and when the sensor system is operable to detect when the first portion of sediment on the surface and surrounding the structure is removed from the first area around the structure, a warning signal based on, the removal-depth signal and a predetermined threshold.

13. The method of claim 9, further comprising:

providing, via the sensor system and when the sensor system is operable to detect when the first portion of sediment on the surface and surrounding the structure is removed from the first area around the structure, a first removal-depth signal to the controller at a first time, $t_1$;

providing, via the sensor system and when the sensor system is operable to detect when the first portion of sediment on the surface and surrounding the structure is removed from the first area around the structure, a second removal-depth signal to the controller at a second time, $t_2$; and outputting, via a comparing component of the controller, a warning signal based on the first removal-depth signal, the second removal-depth signal and a moving average predetermined threshold.

14. The method of claim 9, further comprising:

wherein the plurality of acceleration sensors comprises a first acceleration sensor, wherein when the sensor system is operable to detect when the second portion of sediment is deposited around the structure, the first acceleration sensor is affixed on the conduit so as to be disposed at the initial length, $l_i$, above the surface at the initial time, and wherein when the sensor system is operable to detect when the second portion of sediment is deposited around the structure, the first acceleration sensor is operable to detect when the second portion of sediment is deposited around the structure.

15. The method of claim 14, further comprising:
wherein the plurality of acceleration sensors additionally comprises a second acceleration sensor,
wherein when the second portion of sediment is deposited around the structure, the second acceleration sensor is affixed on the conduit so as to be disposed at a second length, $l_i$, above the surface at the initial time,
wherein when the second portion of sediment is deposited around the structure, $l_i < l_s$, and
wherein when the second portion of sediment is deposited around the structure, the second acceleration sensor is operable to detect when the portion of the surrounding sediment is deposited around the structure by detecting when a third portion of the sediment is deposited around the second acceleration sensor.

16. The method of claim 9, further comprising:
providing, via the sensor system and when the second portion of sediment is deposited around the structure, a deposit-depth signal to the controller, the deposit-depth signal being based on the second portion of the sediment that is deposited around the structure when the second portion of the sediment is deposited around the structure, and
outputting, via a comparing component of the controller and when the second portion of sediment is deposited around the structure, a warning signal based on the deposit-depth signal and a predetermined threshold.

* * * * *